United States Patent
Mattus et al.

(10) Patent No.: US 11,834,107 B2
(45) Date of Patent: Dec. 5, 2023

(54) STEERING DEVICE HAVING A PLUG CONNECTOR UNIT FOR ELECTRICALLY CONTACTING A STEERING SENSOR UNIT

(71) Applicant: Robert Bosch GmbH, Stuttgart (DE)

(72) Inventors: Waldemar Mattus, Schwaebisch Gmuend (DE); Marten Weber, Huettlingen (DE); Tobias Isdebski, Kernen (DE); Philipp Seibold, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 354 days.

(21) Appl. No.: 17/278,300

(22) PCT Filed: Sep. 11, 2019

(86) PCT No.: PCT/EP2019/074287
§ 371 (c)(1),
(2) Date: Mar. 20, 2021

(87) PCT Pub. No.: WO2020/064335
PCT Pub. Date: Apr. 2, 2020

(65) Prior Publication Data
US 2021/0354745 A1    Nov. 18, 2021

(30) Foreign Application Priority Data
Sep. 26, 2018 (DE) ..................... 10 2018 216 477.0

(51) Int. Cl.
*B62D 5/04* (2006.01)
*B62D 6/10* (2006.01)
(Continued)

(52) U.S. Cl.
CPC ............. *B62D 5/0403* (2013.01); *B62D 6/10* (2013.01); *G01L 5/221* (2013.01); *H01R 24/005* (2013.01);
(Continued)

(58) Field of Classification Search
CPC .... B62D 15/0215; B62D 5/0403; B62D 6/10; G01L 5/221; H01R 24/005; H01R 2201/20; H01R 2201/26
See application file for complete search history.

(56) References Cited

U.S. PATENT DOCUMENTS 8,726,530 B2 *  5/2014  Hama ..................... G01L 3/109
                                                     33/534
11,447,180 B2 *  9/2022  Weber ..................... B62D 1/16
(Continued)

FOREIGN PATENT DOCUMENTS

CN     101449636 A     6/2009
CN     102832502 A    12/2012
(Continued)

OTHER PUBLICATIONS

International Search Report corresponding to PCT Application No. PCT/EP2019/074287, dated Dec. 17, 2019 (5 pages).

*Primary Examiner* — Octavia Davis Hollington
(74) *Attorney, Agent, or Firm* — Maginot, Moore & Beck LLP (57) ABSTRACT

A steering device includes a steering transmission housing which provides a sensor recording region, a steering sensor unit arranged in the sensor recording region in an installed state, and plug connector unit arranged, in an installed state, in a contacting recess in the steering transmission housing for electrically contacting the steering sensor unit. The connector unit includes a plug unit for connection to the steering sensor unit and a carrier unit coupled to the plug unit at least in a pre-installed state of the connector unit. The steering device has a decoupling unit which is intended to transmit a force exerted during an installation process of the connector unit onto the plug unit and/or the carrier unit in such a way that the connection between the plug unit and the
(Continued)

carrier unit is released during the installation process of the connector unit.

18 Claims, 7 Drawing Sheets

(51) Int. Cl.
  *G01L 5/22* (2006.01)
  *H01R 24/00* (2011.01)
(52) U.S. Cl.
  CPC ...... *H01R 2201/20* (2013.01); *H01R 2201/26* (2013.01)

(56) References Cited

U.S. PATENT DOCUMENTS

| | | |
|---|---|---|
| 2008/0280481 A1 | 11/2008 | Nachbauer et al. |
| 2021/0339793 A1* | 11/2021 | Mattus ................ G01L 5/221 |

FOREIGN PATENT DOCUMENTS

| | | | | |
|---|---|---|---|---|
| CN | 103867632 A | 6/2014 | | |
| CN | 104604042 A | 5/2015 | | |
| CN | 105161922 A | 12/2015 | | |
| CN | 107431306 A | 12/2017 | | |
| DE | 202 06 391 U1 | 9/2002 | | |
| DE | 10 2010 001 435 A1 | 8/2011 | | |
| DE | 10 2012 202 676 A1 | 8/2013 | | |
| DE | 10 2013 008 205 A1 | 4/2014 | | |
| DE | 10 2013 112 242 A1 | 5/2015 | | |
| DE | 102013112242 A1 * | 5/2015 | ........... | B62D 5/0403 |
| DE | 10 2015 204 781 A1 | 3/2016 | | |
| DE | 10 2016 120 063 A1 | 4/2018 | | |
| EP | 1 986 281 A1 | 10/2008 | | |
| JP | 2001-106097 A | 4/2001 | | |
| JP | 2014-55909 A | 3/2014 | | |
| JP | 2015-87881 A | 5/2015 | | |
| JP | 2015-141745 A | 8/2015 | | |
| JP | 2015-220168 A | 12/2015 | | |
| JP | 2016-39011 A | 3/2016 | | |
| JP | 2018-56067 A | 4/2018 | | |
| WO | 2017/014018 A1 | 1/2017 | | |

* cited by examiner

United States Patent US 11,834,107 B2

STEERING DEVICE HAVING A PLUG CONNECTOR UNIT FOR ELECTRICALLY CONTACTING A STEERING SENSOR UNIT

This application is a 35 U.S.C. § 371 National Stage Application of PCT/EP2019/074287, filed on Sep. 11, 2019, which claims the benefit of priority to Serial No. DE 10 2018 216 477.0, filed on Sep. 26, 2018 in Germany, the disclosures of which are incorporated herein by reference in their entirety.

Background

The disclosure proceeds from a steering device and from a method for assembling a steering device. The disclosure moreover relates to a steering system having such a steering device and to a plug connector unit of such a steering device.

Steering systems for motor vehicles, having steering sensors which are disposed on the steering shaft for determining a steering angle and/or a steering torque exerted on the steering shaft, are known from the prior art. Steering sensors of this type typically comprise a sensor housing which is connected to the steering shaft as well as a sensor element which is disposed in the sensor housing.

In a known assembly process, the sensor housing is pushed onto the steering shaft and fastened to the steering shaft. The steering shaft conjointly with the sensor housing is subsequently inserted into an assembly opening of a steering gear housing, wherein a sensor cable can be simultaneously connected to the sensor housing, or the sensor element, respectively, by an assembly technician. The assembly opening is subsequently closed by means of a housing cover. This construction however leads to a complicated and time-consuming assembly process which requires in particular a plurality of assembly steps as well as manual plug-fitting of the sensor cable during the assembly process of the steering shaft, or of the steering sensor, respectively.

The object of the disclosure lies in particular in providing a steering device and a method for assembling a steering device with improved properties in terms of contacting. The object is achieved by the features described herein, while advantageous design embodiments and refinements of the steering device and method for assembling a steering device are also set forth below.

SUMMARY

The disclosure proceeds from a steering device having a steering gear housing which provides a sensor receptacle region, having a steering sensor unit which, in particular for detecting at least one item of steering information, in particular of a steering shaft which is mounted so as to be rotatable about a steering axis, in an assembled state is disposed in the sensor receptacle region, and having a plug connector unit which for, in particular directly, electrically contacting the steering sensor unit, in particular in an assembly procedure of the plug connector unit, in an assembled state is disposed in a contacting clearance, in particular a bore and/or a cutout, of the steering gear housing that is advantageously closed in the circumferential direction, wherein the plug connector unit comprises a plug-in unit for connecting to the steering sensor unit, and a support unit which at least in a preassembled state of the plug connector unit is coupled to the plug-in unit.

It is proposed that the steering device has an uncoupling unit which is provided for transmitting a force which is exerted in an assembly procedure of the plug connector unit to the plug-in unit and/or the support unit such that the connection between the plug-in unit and the support unit is released in the assembly procedure of the plug connector unit. On account of this design embodiment, advantageously reliable and/or flexible contacting of the steering sensor unit can in particular be achieved by way of a defined plug-in force. Moreover, an assembly procedure herein can in particular be highly simplified, wherein an advantageous automation of the assembly procedure can be achieved, and a number of manual operating steps can be reduced. Furthermore, a flexibility of the steering device can advantageously be increased and/or an operational reliability improved. Furthermore, a service life and/or a durability of the steering device can advantageously be improved.

A "steering device" in this context is in particular to be understood to be at least a part, in particular a functional sub-group, of a steering system, in particular of a vehicle and preferably of a motor vehicle. The steering device can furthermore particularly comprise a housing cover which in an assembled state is provided to cover and in particular close the sensor receptacle region in the axial direction. The steering gear housing herein advantageously has an assembly opening which for receiving the steering sensor unit and advantageously for at least partially receiving the steering shaft is in particular able to be closed by means of the housing cover. The steering shaft is preferably configured in multiple parts and comprises at least an input shaft, preferably a steering spindle, and at least an output shaft which is configured separately from the input shaft, preferably a steering pinion. A longitudinal extent of the steering shaft herein defines in particular the axial direction. The steering device can in particular also comprise the steering shaft. Furthermore, a "steering sensor unit" is in particular to be understood to be a sensor unit which in particular encompasses the steering shaft in the circumferential direction and which by means of a rotation of the steering shaft and advantageously a rotation of the input shaft relative to the output shaft is provided for detecting at least one item of steering information which correlates in particular with an activation of a steering handle of the steering system. The item of steering information herein is preferably a steering angle and/or a steering torque which is in particular applied to the steering shaft by means of the steering handle. The steering sensor unit for detecting the item of steering information can in particular comprise at least one sensor element. "Providing" is in particular to be understood as specially conceived and/or equipped. An object being provided for a specific function is in particular to be understood that the object fulfills and/or carries out this specific function in at least one state of application and/or operation.

Furthermore, a "plug connector unit" is in particular to be understood to be a unit which, in particular in the assembled state, is operatively connected to the steering gear housing and is advantageously configured so as to be separate and/or separated from the steering gear housing and is provided for providing a possibility of contacting for electrically contacting the steering sensor unit. To this end, the plug connector unit comprises in particular the plug-in unit which comprises at least one plug-in element, in particular in the form of a plug, a coupling and/or a socket. The plug-in unit in the assembled state is in particular advantageously completely disposed in the sensor receptacle region and provided for coupling with a further plug-in unit of the steering sensor unit that communicates with the plug-in unit, in particular at least one further plug-in element, in particular in the form of a plug, a coupling and/or a socket of the further plug-in unit.

The further plug-in unit herein is advantageously mounted so as to be fixed and/or immovable relative to the steering gear housing. Moreover a plug-in direction for coupling the plug-in element and the further plug-in element is preferably oriented so as to be at least substantially perpendicular to an assembly direction of the housing cover and/or the axial direction. The plug-in element and the further plug-in element herein are in particular oriented relative to one another in such a manner that automatic electrical contacting of the steering sensor unit takes place during the assembly procedure of the plug connector unit. The term "at least substantially perpendicular" herein is in particular intended to define an orientation of a direction relative to a reference direction, wherein the direction and the reference direction, in particular when viewed in one plane, enclose an angle of in particular between 82° and 98°, advantageously between 85° and 95°, and particularly preferably between 88° and 92°. Furthermore, a "support unit" is to be understood to be in particular a unit which is advantageously at least in the preassembled state of the plug connector unit mechanically coupled to the plug-in unit and which is in particular provided for receiving at least part of a weight of the plug-in unit and for mechanically stabilizing the plug-in unit at least in the assembly procedure of the plug connector unit, in particular so as to enable a coupling between the plug-in element and the further plug-in element. In order for the support unit and the plug-in unit to be coupled, the support unit herein comprises in particular at least one coupling element, and the plug-in unit comprises at least one further coupling element that communicates with the coupling element. An "uncoupling unit" is furthermore particularly to be understood to be a unit which is in particular operatively connected to the plug connector unit, the steering sensor unit and/or the steering gear housing and which in the assembly procedure of the plug connector unit is provided for transmitting the, in particular external, force, in particular the plug-in force and/or rotary force, to the plug-in unit and/or the support unit, in particular in such a manner that the connection between the plug-in unit and the support unit in the assembly procedure of the plug connector unit is released automatically and/or in a self-acting manner and in particular a defined mobility of the plug-in unit, in particular relative to the steering gear housing, is achieved. To this end, the uncoupling unit can in particular also comprise parts of the plug connector unit, of the steering sensor unit, and/or of the steering gear housing, or be formed exclusively from parts of the plug connector unit, of the steering sensor unit, and/or of the steering gear housing.

It is furthermore proposed that the plug-in unit and the support unit are connected to one another in a force-fitting and/or form-fitting manner, on account of which a recyclable plug connector unit can in particular be achieved.

In this context, it is moreover proposed that the plug-in unit and the support unit are connected to one another by means of a latching connection and/or a plug-and-rotate connection, advantageously in the form of a bayonet connection. In this case, the coupling elements are in particular configured as latching elements and/or as pin-and-groove elements. Advantageously simple uncoupling, in particular by means of a linear movement and/or a rotating movement, can in particular be achieved on account thereof.

According to one design embodiment of the disclosure, it is proposed that the force which in the assembly procedure of the plug connector unit is exerted for releasing the connection between the plug-in unit and the support unit comprises at least one plug-in force component which is caused by a linear plug-in movement of the plug connector unit, said plug-in force component acting in particular in the plug-in direction. The force which in the assembly procedure of the plug connector unit is exerted for releasing the connection between the plug-in unit and the support unit herein may in particular also comprise exclusively the plug-in force component. Advantageously rapid and/or intuitive assembling can in particular be achieved on account thereof.

Alternatively or additionally, it is proposed that the force which in the assembly procedure of the plug connector unit is exerted for releasing the connection between the plug-in unit and the support unit comprises at least one rotary force component which is caused by a rotating movement of the plug connector unit and in particular of the support unit, said rotary force component acting in particular at least substantially perpendicular to the plug-in direction. The force which in the assembly procedure of the plug connector unit is exerted for releasing the connection between the plug-in unit and the support unit herein may in particular also comprise exclusively the rotary force component. Advantageously reliable uncoupling can in particular be achieved on account thereof, said uncoupling also being advantageously noticeable from the outside.

Furthermore, the uncoupling unit could comprise, for example, at least one, in particular additional, uncoupling element, for example an elevation, a depression and/or a bar element which in the plug-in procedure is provided for contacting the plug-in unit and/or the support unit so as to transmit the force which is exerted in the assembly procedure of the plug connector unit to the plug-in unit and/or the support unit. Alternatively or additionally however, it is proposed according to one preferred design embodiment of the disclosure, that the uncoupling unit is at least partially configured in one piece with the steering sensor unit and/or the steering gear housing.

An object being "at least partially configured in one piece" with a further object in this context is in particular to be understood that the objects have at least one common component, and/or at least one component of the object and/or the object are/is connected and/or configured so as to be in one piece with at least one component of the further object and/or the further object. "In one piece" in this context is in particular to be understood as being at least connected in a materially integral manner and/or so as to be conjointly configured. The materially integral connection can be established, for example, by an adhesive process, an overmolding process, a welding process, a soldering/brazing process, and/or another process. However, "in one piece" is advantageously also to be understood as formed from one piece and/or in one piece. This one piece is preferably produced from a single blank, a single compound and/or a single casting, such as by an extrusion method and/or an injection-molding method, for example. An advantageously compact design embodiment can in particular be achieved on account thereof.

It is furthermore preferably proposed that the uncoupling unit comprises at least one uncoupling element which is disposed on the steering gear housing, on account of which in particular a particularly simple and/or efficient transmission of force can be achieved. The uncoupling element herein is advantageously configured as a ramp and is disposed in the region of the contacting clearance of the steering gear housing.

Alternatively or additionally, it is proposed that the uncoupling unit comprises at least one further uncoupling element which is part of a further plug-in unit of the steering sensor unit that communicates with the plug-in unit, in particular of the further plug-in unit already mentioned above. The further uncoupling element, for releasing the connection between the plug-in unit and the support unit, in the assembly procedure of the plug connector unit herein is advantageously provided for contacting the plug-in unit, in particular in such a manner that the force, advantageously the rotary force, which is exerted in the assembly procedure of the plug connector unit is transmitted to the coupling elements by way of the plug-in unit. A design embodiment which is almost neutral in terms of installation space can in particular be achieved on account thereof.

It is furthermore proposed that the plug-in unit comprises at least one plug-in element, in particular the plug-in element already mentioned above, and at least one electrical line element, in particular a cable, for flexibly connecting the plug-in element to the support unit. On account thereof, the plug-in element is advantageously movable, in particular while assembling and/or in the operation of the steering device, on account of which tolerances and/or movements can advantageously be compensated.

In one further design embodiment of the disclosure, it is proposed that the plug-in unit for connecting to the support unit, and/or the support unit for connecting to the plug-in unit, comprise/comprises at least one elastic compensation element which, at least during the assembly procedure of the plug connector unit, is provided for mounting at least one plug-in element of the plug-in unit, in particular the plug-in element already mentioned above, in particular so as to be resilient in the plug-in direction. A "compensation element" is herein in particular to be understood to be an element which is provided for exerting and/or transmitting a force, advantageously a compressive force, on the at least one plug-in element, which is in particular operatively connected to the support unit and or the plug-in unit. The compensation element herein is preferably at least provided for compensating forces which arise in the assembly procedure of the plug connector unit and/or for transmitting said forces to the plug-in element in such a manner that a coupling is established between the plug-in element and the further plug-in element and, on account thereof, direct and/or automatic electrical contacting of the steering sensor unit takes place in the assembly procedure of the plug connector unit. The compensation element is moreover advantageously provided for stabilizing and/or keeping in a defined and/or established orientation, the plug-in element when coupling the plug-in elements. At least one of the coupling elements herein is preferably disposed on the compensation element. The compensation element could be configured, for example, as a rubber element, as an elastomer element, as a silicone element and/or as a gel element. The compensation element is however preferably configured as a spring element, in particular as a tension spring and/or a compression spring, and particularly preferably as a metal spring. An "elastic object" is furthermore in particular to be understood to be an object which has at least one sub-region and/or at least one part which in terms of at least the position thereof in a normal operating state is variable by at least 1 mm, preferably by at least 2.5 mm, and particularly preferably by at least 5 mm, and which generates in particular a counterforce which is a function of a variation of the position and is preferably proportional to the variation, which acts in particular counter to the variation. The elastic element is in particular able to be repeatedly deformed, in particular without damage, and upon deformation tends in particular to return to its basic shape. An advantageous assembly procedure can in particular be achieved on account thereof, wherein tolerances during the assembly procedure can in particular be compensated and/or a maximum permissible plug-in force can be varied as a function of a maximum assembly force. Moreover, damage to the plug-in element can in particular be avoided.

It is furthermore proposed that the plug connector unit is provided for providing an electrical connection between the sensor receptacle region and an external side of the steering gear housing, on account of which in particular, particularly simple electrical contacting of the steering sensor unit can be achieved. The support unit herein is preferably configured as a cable conduit, in particular for a cable of the plug-in unit and/or a sensor cable, and/or has a cable conduit, in particular for the cable of the plug-in unit and/or the sensor cable, wherein the cable and/or the sensor cable can be provided, for example, for establishing and/or providing an electrical connection to a control apparatus of the steering device. The support unit is particularly preferably configured so as to be separate from the steering gear housing, and in the assembled state is fixedly connected to the steering gear housing.

Particularly simple and/or reliable uncoupling of the plug-in elements can in particular be achieved when the steering device, which is in particular disposed on the steering gear housing and advantageously on the external side of the steering gear housing, has a guide unit which in the assembly procedure is provided for establishing a defined orientation of the plug connector unit relative to the steering gear housing and in the assembly procedure for guiding the plug connector unit relative to the steering gear housing. The guide unit herein preferably comprises at least one guide element which is configured as a guide depression and/or a guide groove.

The disclosure moreover relates to a method for assembling a steering device, wherein the steering device comprises a steering gear housing which provides a sensor receptacle region, a steering sensor unit which, in particular for detecting at least one item of steering information, in particular of a steering shaft which is mounted so as to be rotatable about a steering axis, in an assembled state is disposed in the sensor receptacle region, and a plug connector unit which for, in particular directly, electrically contacting the steering sensor unit, in particular in an assembly procedure of the plug connector unit, in an assembled state is disposed in a contacting clearance, in particular a bore and/or a cutout, of the steering gear housing that is advantageously closed in the circumferential direction, and wherein the plug connector unit comprises a plug-in unit for connecting to the steering sensor unit, and a support unit which, at least in a preassembled state of the plug connector unit is coupled to the plug-in unit.

It is proposed that a force which is exerted in an assembly procedure of the plug connector unit is transmitted to the plug-in unit and/or the support unit, in particular by means of an uncoupling unit, in such a manner that the connection between the plug-in unit and the support unit is released in the assembly procedure of the plug connector unit. The advantages already mentioned above can in particular be achieved on account thereof. Advantageously reliable and/or flexible contacting of the steering sensor unit by way of a defined plug-in force can in particular be achieved herein.

In a first assembly step herein, a preassembled, mechanically intercoupled, functional sub-group is preferably produced at least from the plug-in unit and the support unit; in a second assembly step, a preassembled steering sensor functional group is produced at least from the steering sensor unit and the steering shaft; in a third assembly step, the preassembled steering sensor functional group is inserted into the assembly opening of the steering gear housing; in a fourth assembly step, the plug connector unit in the form of the preassembled functional sub-group is incorporated into the contacting clearance of the steering gear housing such that direct electrical contacting of the steering sensor unit is achieved, and the force which is exerted in the assembly procedure of the plug connector unit is simultaneously transmitted to the plug-in unit and/or the support unit by means of the uncoupling unit, in particular in such a manner that the, in particular mechanical, connection between the plug-in unit and the support unit is released, in particular automatically and/or in a self-acting manner; and in a fifth assembly step the assembly opening is closed by means of the housing cover. Alternatively however, individual assembly steps and/or a sequence of assembly steps herein may also vary.

The steering device, the steering system, the plug connector unit and the method for assembling the steering device herein are not intended to be limited to the application and embodiment described above. In particular, the steering device, the steering system, the plug connector unit and the method for assembling the steering device may, in order to implement a function described herein, have a number of individual elements, components and units which differs from a number stated herein.

BRIEF DESCRIPTION OF THE DRAWINGS

Further advantages are derived from the following description of the drawings. Exemplary embodiments of the disclosure are illustrated in the drawings. The drawings, the description and the claims contain numerous aspects of the disclosure. The person skilled in the art will expediently also consider these aspects individually and combine them so as to form expedient further combinations.

In the drawings.

DETAILED DESCRIPTION

Figure 1:
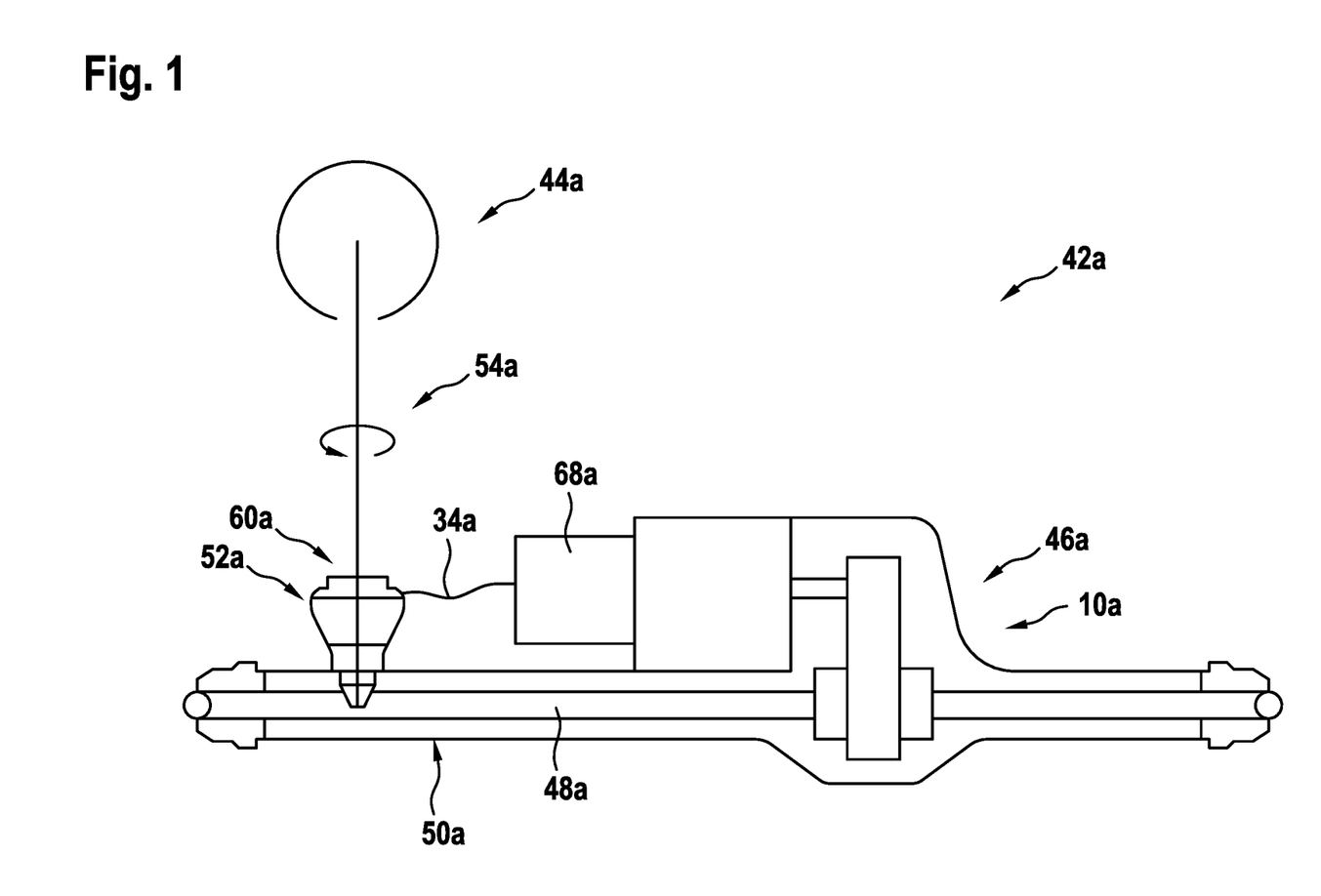
FIG. 1 shows an exemplary steering system having a steering device in a schematic illustration.

FIG. 1 shows a purely exemplary steering system 42a in a schematic illustration. The steering system 42a is configured as an electrically assisted steering system and accordingly has an electrical servo assistance. Furthermore, the steering system 42a is provided for use in a vehicle (not illustrated), in particular a motor vehicle. The steering system 42a in an installed state is operatively connected to the vehicle wheels of the vehicle and is provided for influencing travel direction of the vehicle. In principle, it is of course also conceivable for a steering system to be configured as a hydraulically assisted steering system, in particular having a hydraulic servo assistance.

The steering system 42a has a steering device. The steering device comprises a steering handle 44a, in the present case configured in an exemplary manner as a steering wheel, for applying a manual steering torque, as well as a steering gear 46a which is known per se and provided for converting a steering command at the steering handle 44a to a steering movement of the vehicle wheels. To this end, the steering gear 46a comprises a steering actuating element 48a as well as a steering gear housing 10a having a first housing portion 50a for the steering actuating element 48a and having a second housing portion 52a which provides a sensor receptacle region 12a (cf. in particular also FIGS. 2 and 4b).

The steering device moreover comprises a steering shaft 54a which is known per se. The steering shaft 54a connects the steering handle 44a to the steering gear 46a, in particular to the steering actuating element 48a, and to this end in an assembled state is at least partially inserted in an assembly opening 56a of the steering gear housing 10a, and in particular of the second housing portion 52a, said assembly opening 56a delimiting in particular the sensor receptacle region 12a. A longitudinal extent of the steering shaft 54a herein defines an axial direction 58a.

The steering shaft 54a is mounted so as to be rotatable about a steering axis which is oriented so as to be parallel to the axial direction 58a. The steering shaft 54a is furthermore configured in multiple parts. The steering shaft 54a comprises an input shaft in the form of a steering spindle that is assigned to the steering handle 44a, an output shaft in the form of a steering pinion which is assigned to the steering gear 46a and configured so as to be separate from the input shaft, and a torsion element which is advantageously configured as a torsion bar and connects the input shaft to the output shaft. In principle however, it is also conceivable for a steering shaft to be configured in one piece.

The steering device furthermore comprises a housing cover 60a. The housing cover 60a has a passage opening for the steering shaft 54a, said passage opening being sealed by means of an injected sealing element, for example. The housing cover 60a in an assembled state is provided for covering the assembly opening 56a of the steering gear housing 10a and thus the sensor receptacle region 12a in the axial direction 58a, and in particular for closing said assembly opening 56a in a fluid-tight manner.

Figure 2:
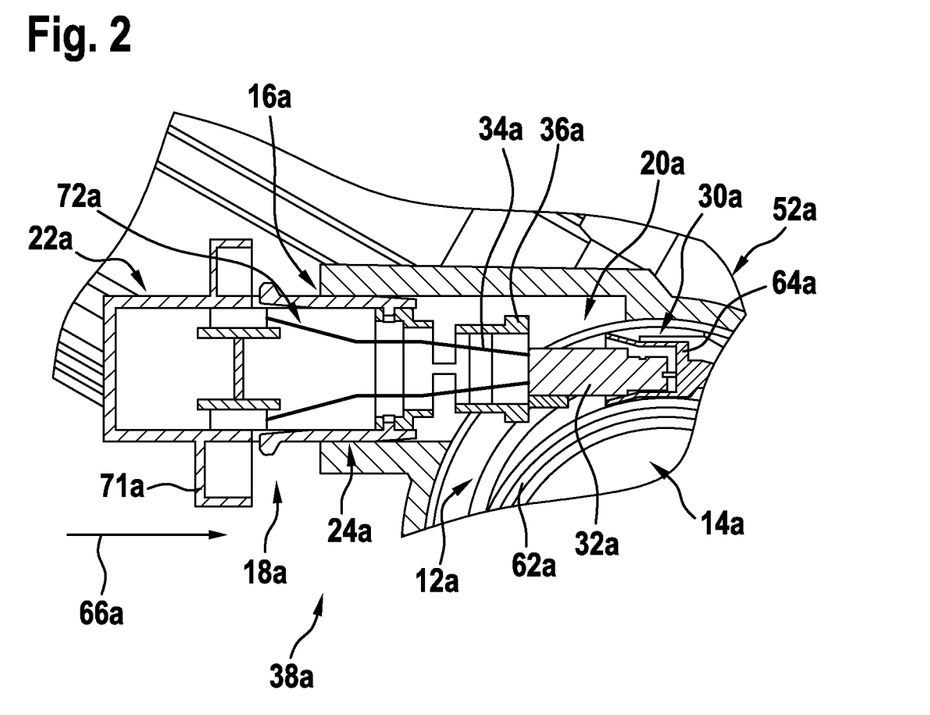
FIG. 2 shows the steering device in an assembled state in a perspective sectional illustration.

The steering device furthermore has a steering sensor unit 14a. The steering sensor unit 14a in the assembled state is disposed in the sensor receptacle region 12a and herein encompasses the steering shaft 54a in the circumferential direction. In the present case, the steering sensor unit 14a by means of a rotation of the steering shaft 54a is provided for detecting at least one item of steering information which in particular correlates with an activation of the steering handle 44a, in particular a steering angle and/or a steering torque. To this end, the steering sensor unit 14a comprises a sensor housing 62a, configured in particular as a receptacle housing, as well as at least one sensor element (not illustrated) which for detecting the item of steering information is disposed in the sensor housing 62a.

The steering sensor unit 14a moreover comprises a first plug-in unit 30a. The first plug-in unit 30a is mounted in the sensor housing 62a. The first plug-in unit 30a in an assembled state of the steering sensor unit 14a herein is disposed so as to be fixed and/or immovable relative to the steering gear housing 10a. The first plug-in unit 30a comprises a first plug-in element 64a. The first plug-in element

64a is electrically connected to the sensor element or to a pressed screen of the steering sensor unit 14a that is connected to the sensor element. The first plug-in element 64a in the present case is configured in an exemplary manner as a coupling and/or a socket. Alternatively however, a first plug-in unit could also comprise a first plug-in element which is configured as a plug, and/or a plurality of first plug-in elements.

Figure 4A:
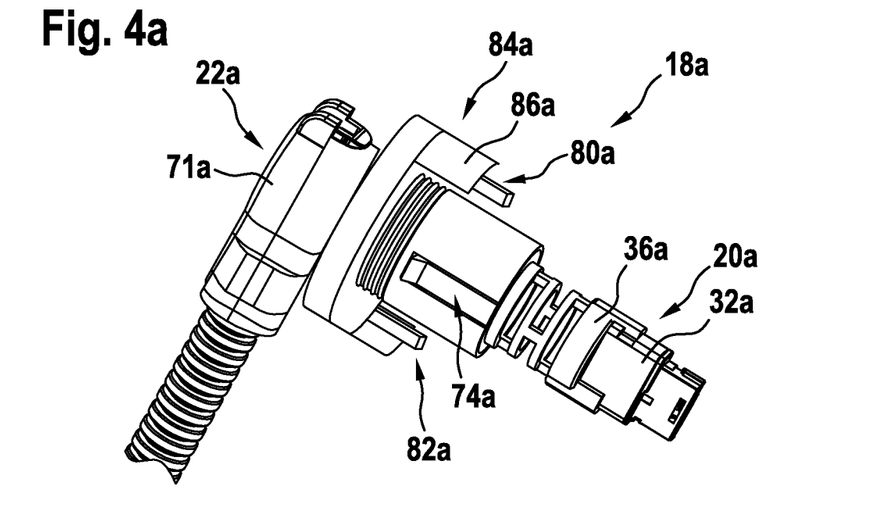
FIGS. 4a-b show a plug connector unit and a steering gear housing of the steering device in perspective illustrations.

The steering device for electrically contacting the steering sensor unit 14a and in particular the first plug-in unit 30a moreover comprises a plug connector unit 18a (cf. in particular also FIG. 4a). The plug connector unit 18a is configured separately from the steering gear housing 10a and in the assembled state is fixedly connected to the steering gear housing 10a and in particular to the second housing portion 52a. The plug connector unit 18a in the assembled state herein is disposed in a contacting clearance 16a, in particular in the form of a bore and/or a cutout, of the steering gear housing 10a. The plug connector unit 18a is consequently at least partially disposed outside the steering gear housing 10a and in an assembly procedure can be connected to the steering gear housing 10a, for example by an assembly technician and/or by a machine, in particular in that the plug connector unit 18a is incorporated into the contacting clearance 16a advantageously in a linear movement. The plug connector unit 18a is furthermore configured as a cable conduit and provided for providing an electrical connection between the sensor receptacle region 12a and an external side 38a of the steering gear housing 10a.

For electrically connecting to the steering sensor unit 14a, the plug connector unit 18a comprises a second plug-in unit 20a which is able to be coupled to the first plug-in unit 30a. To this end, the second plug-in unit 20a comprises a second plug-in element 32a. The second plug-in element 32a is configured in a manner corresponding to the first plug-in element 64a. The second plug-in element 32a in the present case is configured in an exemplary manner as a plug, in particular as a standard plug. Furthermore, the second plug-in element 32a is able to be coupled to the first plug-in element 64a in a plug-in direction 66a, the latter oriented so as to be perpendicular to the axial direction 58a. The second plug-in element 32a is provided for being connected to the first plug-in element 64a in the plug-in direction 66a and on account thereof for enabling electrical contacting of the steering sensor unit 14a. Alternatively however, a second plug-in unit could also comprise a second plug-in element configured as a coupling and/or a socket, and/or a plurality of second plug-in elements. Moreover, the second plug-in unit 20a comprises at least one electrical line element 34a. The electrical line element 34a is configured so as to be flexible and in the present case in particular as a cable. The electrical line element 34a is configured as a sensor cable and is provided for flexibly connecting the second plug-in element 32a to a control apparatus 68a of the steering device, for example. Alternatively however, a plug connector unit could also have at least one sensor cable plug-in element which is in particular disposed in the region of an external side of a steering gear housing and is provided for coupling a, in particular additional, sensor cable.

The second plug-in unit 20a in the present case furthermore comprises an elastic compensation element 36a. The compensation element 36a is assigned to the second plug-in element 32a and is operatively connected to the latter. In the present case, the compensation element 36a contacts the second plug-in element 32a. The compensation element 36a is fastened to the second plug-in element 32a. The compensation element 36a herein at least largely and advantageously completely encompasses the electrical line element 34a. The compensation element 36a is furthermore configured as a spring element, in particular as a tension spring and/or a compression spring. The compensation element 36a at least during the assembly procedure of the plug connector unit 18a is provided for mounting the second plug-in element 32a so as to be resilient in the plug-in direction 66a. The compensation element 36a herein is provided for impinging the second plug-in element 32a with a force that acts in the plug-in direction 66a, and for damping and/or compensating a plug-in force that acts on the second plug-in element 32a when coupling the plug-in elements 32a, 64a. The compensation element 36a is moreover provided for stabilizing the second plug-in element 32a when coupling the plug-in elements 32a, 64a, and for keeping said second plug-in element 32a in a defined and/or established orientation so as to enable coupling between the first plug-in element 64a and the second plug-in element 32a and for advantageously compensating tolerances during the assembly procedure of the plug connector unit 18a. Alternatively however, a compensation element could also be assigned to a component of a plug connector unit which differs from a second plug-in unit such as, for example a support unit. It is moreover conceivable for a plurality of compensation elements to be provided. Furthermore, a compensation element could also be disposed in such a manner that said compensation element does not directly contact a second plug-in element. A compensation element could also be configured as an elastic element which differs from a spring element. In principle, it is furthermore also conceivable for a compensation element to be completely dispensed with.

Figure 3A:
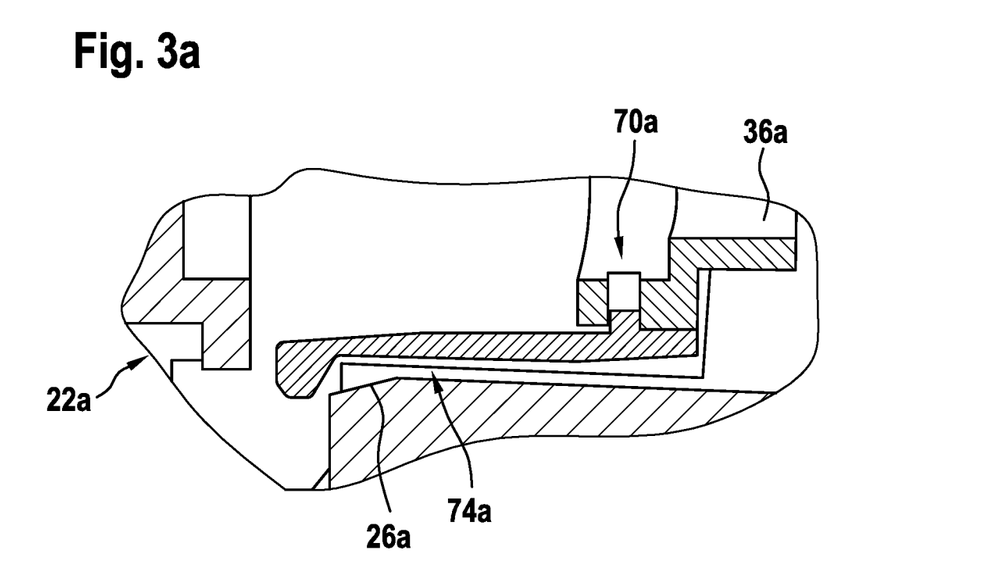
FIGS. 3a-b show illustrations of details of the steering device according to FIG. 2 in two different assembly states.
Figure 3B:
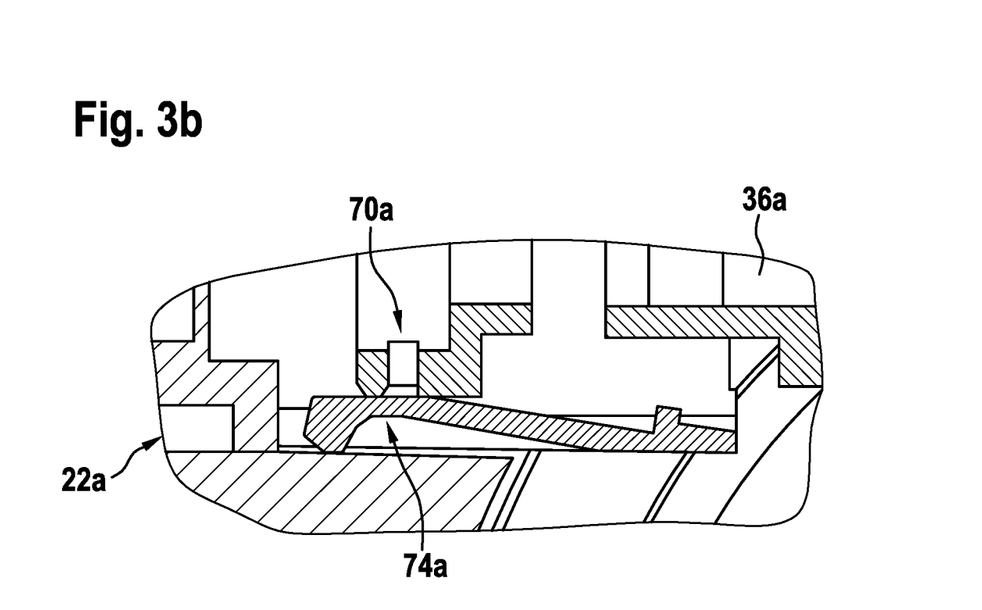

The second plug-in unit 20a moreover comprises at least one coupling element 70a (cf. in particular also FIGS. 3a and 3b). In the present case, the second plug-in unit 20a has a plurality of coupling elements 70a, wherein only one of the coupling elements 70a is illustrated for reasons of clarity in the figures. The coupling elements 70a are disposed on the compensation element 36a, in particular on a rear side of the compensation element 36a that faces away from the second plug-in element 32a. The coupling elements 70a are moreover configured as latching elements, in the present case in particular as a latching clearance and/or a latching groove. In principle however, it is also conceivable for a coupling element to be disposed on a second plug-in element. In principle, at least one coupling element could furthermore also be configured as a latching arm, as a latching lever, and/or as a latching hook.

The plug connector unit 18a furthermore comprises a support unit 22a (cf. in particular also FIG. 4a). The support unit 22a comprises a support main body 71a. The support main body 71a in the assembled state contacts the steering gear housing 10a and closes the contacting clearance 16a in a fluid-tight manner. The support main body 71a moreover delimits a cable conduit duct 72a for the electrical line element 34a. On account of the electrical line element 34a, the second plug-in element 32a herein is flexibly connected to the support unit 22a. Furthermore, the support unit 22a, at least in a preassembled state of the plug connector unit 18a, is mechanically coupled to the second plug-in unit 20a. The support unit 22a herein is connected in a force-fitting and/or form-fitting manner to the second plug-in unit 20a. In the present case, the support unit 22a is connected to the second plug-in unit 20a by means of a latching connection. The support unit 22a is provided for absorbing at least part of a weight of the second plug-in unit 20a and, at least in the assembly procedure of the plug connector unit 18a, for mechanically stabilizing the second plug-in unit 20a so as to in particular enable coupling between the plug-in elements 32a, 64a.

In order to be coupled to the second plug-in unit 20a, the support unit 22a comprises at least one further coupling element 74a (cf. in particular also FIGS. 3a and 3b). In the present case, the support unit 22a has a plurality of further coupling elements 74a, wherein only one of the further coupling elements 74a is illustrated for reasons of clarity in the figures. The further coupling elements 74a are disposed on the support main body 71a. The further coupling elements 74a are configured in a manner corresponding to that of the coupling elements 70a. The further coupling elements 74a are configured as latching levers and are able to be deflected in a direction which is oriented so as to be perpendicular to the plug-in direction 66a. The further coupling elements 74a are provided for interacting with the coupling elements 70a so as to enable coupling between the support unit 22a and the second plug-in unit 20a, and in the present case in particular the compensation element 36a. The further coupling elements 74a in the coupled state herein are preloaded in the direction which is oriented so as to be perpendicular to the plug-in direction 66a, on account of which reliable coupling between the support unit 22a and the second plug-in unit 20a can be achieved. In principle however, it is also conceivable for at least one further coupling element to be configured as a latching depression and/or a latching groove.

The steering device moreover comprises an uncoupling unit 24a. The uncoupling unit 24a is operatively connected to the steering gear housing 10a and the plug connector unit 18b. In the present case, the uncoupling unit 24a is configured so as to be in one piece with the steering gear housing 10a. The uncoupling unit 24a is provided for transmitting a force, in the present case in particular a linear plug-in force, which is exerted in an assembly procedure of the plug connector unit 18a to the support unit 22a and in particular the further coupling elements 74a in such a manner that the connection between the second plug-in unit 20a and the support unit 22a is released in the assembly procedure of the plug connector unit 18a. The force which is exerted in the assembly procedure of the plug connector unit 18a herein is in the present case caused exclusively by a linear plug-in movement of the plug connector unit 18a. Consequently, the force which is exerted in the assembly procedure of the plug connector unit 18a for releasing the connection between the second plug-in unit 20a and the support unit 22a comprises a plug-in force component which is caused by a linear plug-in movement of the plug connector unit 18a.

The uncoupling unit 24a herein comprises at least one uncoupling element 26a which is disposed on the steering gear housing 10a (cf. in particular also FIG. 3a). The uncoupling element 26a is disposed in the region of the contacting clearance 16a of the steering gear housing 10a. In the present case, the uncoupling element 26a is configured as a ramp. The uncoupling element 26a in the assembly procedure of the plug connector unit 18a is provided for interacting with the further coupling elements 74a and for deflecting the further coupling elements 74a in the direction which is oriented so as to be perpendicular to the plug-in direction 66a, on account of which the connection between the second plug-in unit 20a and the support unit 22a is released automatically and/or in a self-acting manner in the assembly procedure of the plug connector unit 18a. Alternatively or additionally, an uncoupling unit could however also be provided for transmitting a force which is exerted in an assembly procedure of a plug connector unit to a second plug-in unit. In principle moreover, an uncoupling unit could also comprise a plurality of uncoupling elements.

Figure 4B:
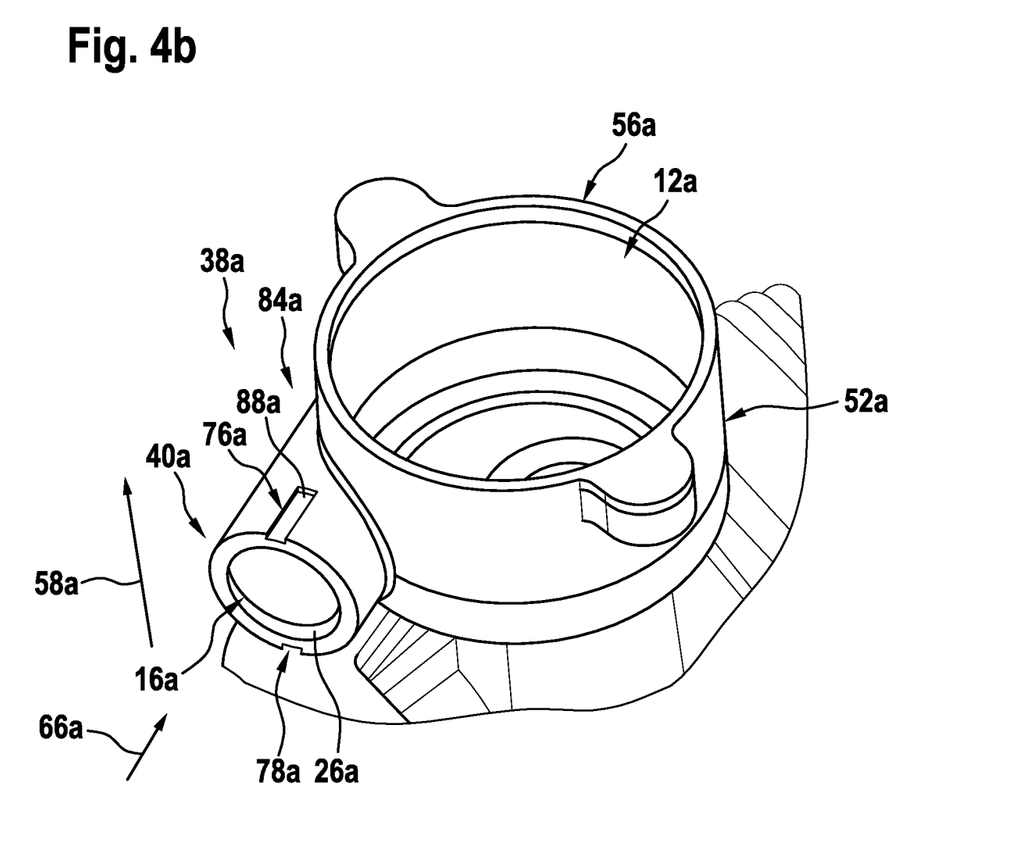

The steering device can moreover comprise a guide unit 40a (cf. in particular FIG. 4b). The guide unit 40a is disposed on the steering gear housing 10a. In the present case, the guide unit 40a is disposed on the external side 38a of the steering gear housing 10a, and in particular in the region of the contacting clearance 16a of the steering gear housing 10a. The guide unit 40a in the assembly procedure is provided for establishing a defined orientation of the plug connector unit 18a relative to the steering gear housing 10a, and in the assembly procedure for guiding the plug connector unit 18a, in particular in a linear movement, relative to the steering gear housing 10a.

To this end, the guide unit 40a comprises at least one guide element 76a, 78a. In the present case, the guide unit 40a comprises two mutually opposite guide elements 76a, 78a. The guide elements 76a, 78a herein are in each case configured as a guide depression and/or a guide groove and have a linear profile in the plug-in direction 66a. The guide elements 76a, 78a for guiding the plug connector unit 18a in the assembly procedure are provided for interacting with further guide elements 80a, 82a of the plug connector unit 18a, in particular the support unit 22a. Alternatively however, a guide unit could also comprise exactly one guide element which is disposed on a steering gear housing. It is moreover conceivable for a guide unit to be completely dispensed with.

The steering device moreover has a fastening unit 84a which is provided for fastening the plug connector unit 18a, in particular the support unit 22a, to the steering gear housing 10a. To this end, the fastening unit 84a comprises at least one first fastening element 86a which is assigned to the plug connector unit 18a, and at least one second fastening element 88a which is assigned to the steering gear housing 10a and is configured in a manner corresponding to that of the first fastening element 86a. In principle, the fastening unit 84a herein can comprise an arbitrary number of fastening elements 86a, 88a. However, the fastening unit 84a preferably comprises at least two first fastening elements 86a which are assigned to the plug connector unit 18a, as well as at least two second fastening elements 88a which are assigned to the steering gear housing 10a. The fastening elements 86a, 88a in the present case are configured in an exemplary manner as latching elements. The fastening elements 86a, 88a are provided for fixing the plug connector unit 18a in a final assembly position.

An exemplary method for assembling the steering device will be described hereunder with reference to FIG. 5.

In a first assembly step 90a, a mechanically intercoupled, preassembled functional sub-group is produced at least from the second plug-in unit 20a and the support unit 22a.

In a second assembly step 92a, a preassembled steering sensor functional group is moreover produced at least from the steering sensor unit 14a and the steering shaft 54a.

In a third assembly step 94a, the preassembled steering sensor functional group is inserted into the assembly opening 56a of the steering gear housing 10a, wherein the steering shaft 56a is pushed in directly up to a terminal position.

In a fourth assembly step 96a, the plug connector unit 18a in the form of the preassembled functional sub-group is incorporated into the contacting clearance 16a of the steering gear housing 10a, wherein a defined orientation of the plug connector unit 18a relative to the steering gear housing 10a is established by the guide unit 40a, and linear guiding of the plug connector unit 18a relative to the steering gear housing 10a takes place, on account of which direct electrical contacting of the steering sensor unit 14a can be achieved. In the assembly procedure of the plug connector unit 18a herein, the second plug-in element 32a is advantageously fitted up to a terminal detent in such a manner that the compensation element 36a is compressed in the plug-in direction 66a. At the same time, the force which is exerted in the assembly procedure of the plug connector unit 18a, in particular by means of the uncoupling unit 24a, is transmitted to the support unit 22a and in particular the further coupling elements 74a in such a manner that the connection between the second plug-in unit 20a and the support unit 22a is released automatically and/or in a self-acting manner. The plug connector unit 18a in the final assembly position is then fixed to the steering gear housing 10a by means of the fastening elements 86a, 88a.

In a fifth assembly step 98a, the assembly opening 56a is closed by means of the housing cover 60a.

Figure 5:
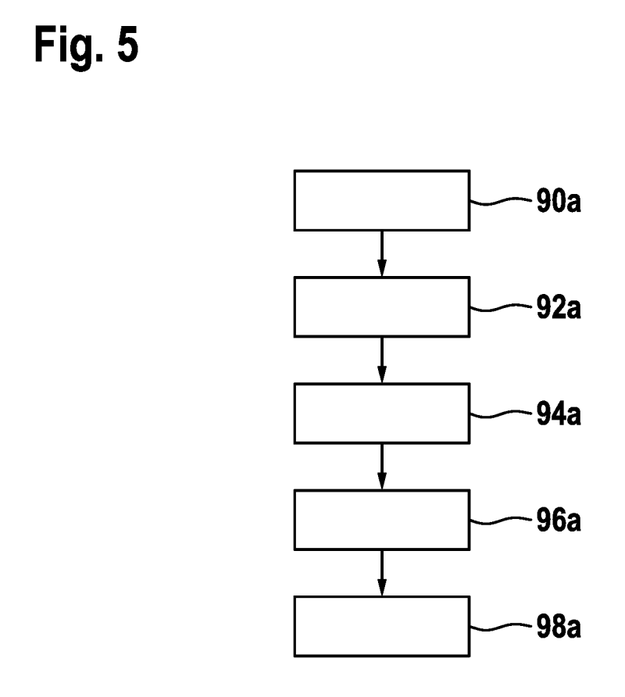
FIG. 5 shows an exemplary flow chart of a method for assembling the steering device.

The exemplary flowchart in FIG. 5 herein is intended to describe a method for assembling the steering device in particular only in an exemplary manner. In particular, individual assembly steps and/or a sequence of the assembly steps may vary. Moreover, the first assembly step 90a and/or the second assembly step 92a could in principle also be dispensed with, for example if the preassembled functional sub-group and/or the preassembled steering sensor functional group are/is already commercially available. Furthermore, guiding of the plug connector unit 18a in the fourth assembly step 96a could also take place in a manner which differs from linear guiding, and/or a force which is exerted in the assembly procedure of the plug connector unit 18a could be transmitted to the second plug-in unit 20a, in particular by means of the uncoupling unit 24a.

Further exemplary embodiments of the disclosure are shown in FIGS. 6a to 8. The description hereunder and the drawings are substantially limited to the points of differentiation between the exemplary embodiments, wherein in terms of identically identified components, in particular in terms of components with the same reference signs, reference in principle can also be made to the drawings and/or the description of the other exemplary embodiments, in particular the exemplary embodiment of FIGS. 1 to 5. In order for the exemplary embodiments to be differentiated, the suffix a has been added to the reference signs of the exemplary embodiment in FIGS. 1 to 5. The suffix a in the exemplary embodiment of FIGS. 6a to 8 has been replaced by the suffixes b and c.

Figure 6A:
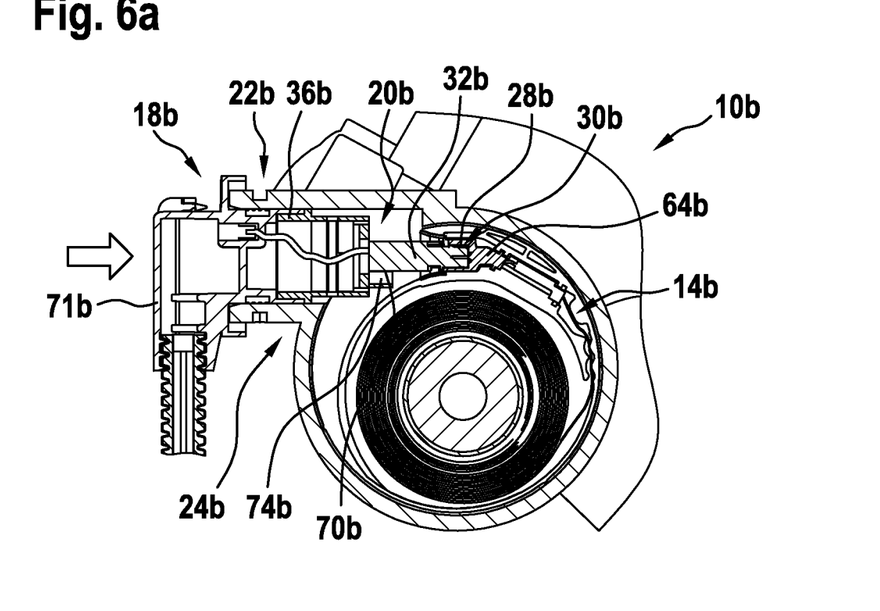
FIGS. 6a-b show a further exemplary embodiment of a further steering device in a perspective illustration in two different assembly states.
Figure 6B:
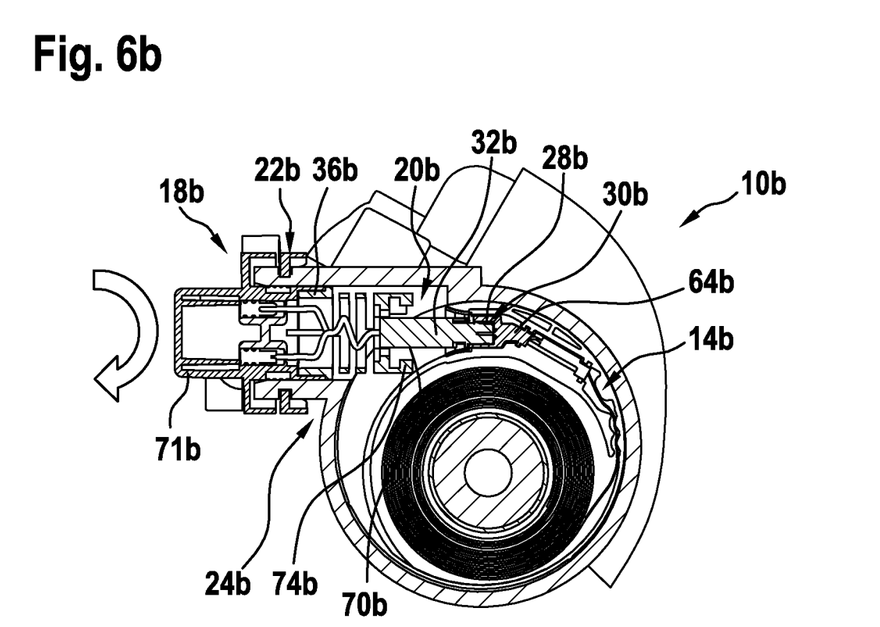
Figure 7:
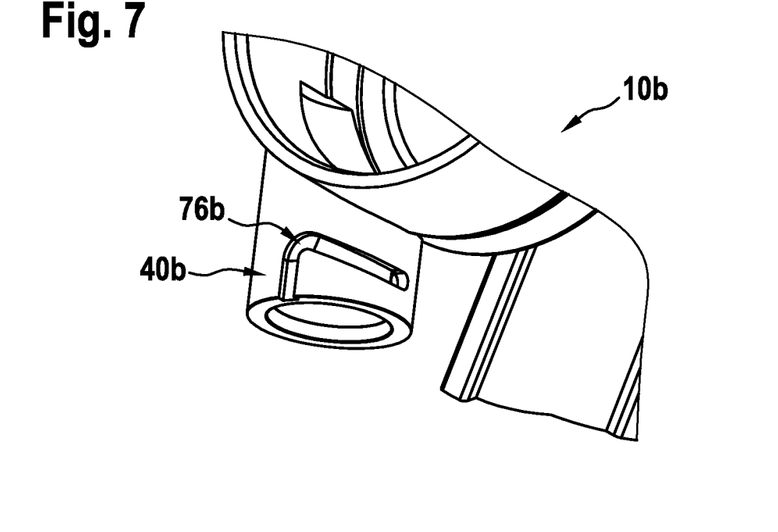
FIG. 7 shows a steering gear housing of the steering device from FIGS. 6a-b in a perspective illustration.

A further exemplary embodiment of the disclosure is shown in FIGS. 6a to 7. The suffix b has been added to the exemplary embodiment of FIGS. 6a to 7. The further exemplary embodiment of FIGS. 6a to 7 differs from the preceding exemplary embodiment at least substantially by way of a design embodiment of a connection between a second plug-in unit 20b and a support unit 22b of a plug connector unit 18b of a steering device.

In the present case, the second plug-in unit 20b and the support unit 22b are connected to one another by means of a plug-and-rotate connection.

The second plug-in unit 20b herein is free of any compensation element. Accordingly, the coupling elements 70b of the second plug-in unit 20b are disposed directly on a second plug-in element 32b of the second plug-in unit 20b. The coupling elements 70b are moreover configured as pin-and-groove elements.

The support unit 22b furthermore comprises an elastic compensation element 36b. In the present case, the compensation element 36b contacts a support main body 71b and the second plug-in element 32b. The compensation element 36b is fastened to the support main body 71b. Further coupling elements 74b of the support unit 22b herein are disposed on the compensation element 36b, in particular on a front side of the compensation element 36b that faces the second plug-in element 32b. The further coupling elements 74b are moreover configured as pin-and-groove elements.

Moreover, an uncoupling unit 24b is operatively connected to a steering sensor unit 14b. The uncoupling unit 24b is configured so as to be in one piece with the steering sensor unit 14b, in particular a first plug-in unit 30b of the steering sensor unit 14b. The uncoupling unit 24b is provided for transmitting by way of the first plug-in unit 30b and the second plug-in unit 20b a force, in the present case in particular a rotary force, which is exerted in an assembly procedure of the plug connector unit 18b, to the support unit 22b and in particular the further coupling elements 74b in such a manner that the connection between the second plug-in unit 20b and the support unit 22b is released in the assembly procedure of the plug connector unit 18b. The force which is exerted in the assembly procedure of the plug connector unit 18b herein in the present case is caused by a rotating movement of the plug connector unit 18b, in particular about an angle of 90°. Consequently, the force which is exerted in the assembly procedure of the plug connector unit 18b for releasing the connection between the second plug-in unit 20b and the support unit 22b comprises a rotary force component which is caused by a rotating movement of the plug connector unit 18b.

The uncoupling unit 24b herein comprises at least one uncoupling element 28b which is disposed on the steering sensor unit 14b and is part of the first plug-in unit 30b. In the present case, the uncoupling element 28b herein corresponds to a wall of a first plug-in element 64b of the first plug-in unit 30b, said wall establishing a retaining force. In the present case, the uncoupling element 28b in the assembly procedure of the plug connector unit 18b is provided for interacting with the second plug-in element 32b and for firmly holding the second plug-in element 32b in the rotating movement of the plug connector unit 18b, on account of which the connection between the second plug-in unit 20b and the support unit 22b is released automatically and/or in a self-acting manner in the assembly procedure of the plug connector unit 18b.

A guide unit 40b of the steering device that is disposed on a steering gear housing 10b is moreover illustrated in FIG. 7. In the present case, the guide unit 40b in the assembly procedure is provided for guiding the plug connector unit 18b in a rotating movement relative to the steering gear housing 10b.

To this end, the guide unit 40b comprises a guide element 76b which is configured as a guide depression and/or a guide groove and at least in portions has a curved and/or bent profile. The guide element 76b herein comprises a first guide portion having a linear profile for introducing the plug connector unit 18b into the steering gear housing 10b, and a second guide portion having a curved and/or bent profile for releasing the connection between the second plug-in unit 20b and the support unit 22b. The guide unit 40b in the present case is thus likewise part of the uncoupling unit 24b. In principle however, a guide unit of this type could also be dispensed with.

Figure 8:
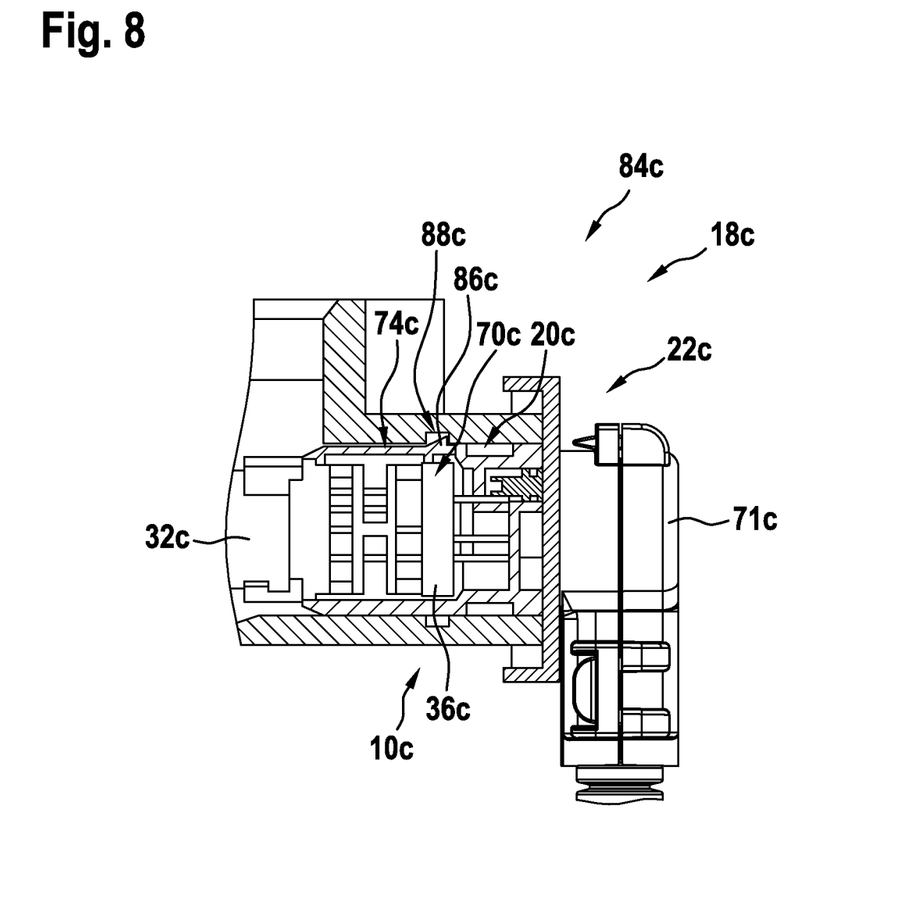
FIG. 8 shows a further exemplary embodiment of a further steering device in a perspective sectional illustration.

FIG. 8 shows a further exemplary embodiment of the disclosure. The suffix c has been added to the exemplary embodiment of FIG. 8. The further exemplary embodiment of FIG. 8 differs from the preceding exemplary embodiments at least substantially by way of a disposal of a fastening unit 84c of a steering device.

A plug connector unit 18c in this case comprises a second plug-in unit 20c as well as a support unit 22c and corresponds at least substantially to a plug connector unit 18a of the first exemplary embodiment.

In order to be coupled to the second plug-in unit 20c, the support unit 22c in a manner analogous to that of the first exemplary embodiment comprises at least one further coupling element 74c which is disposed on a support main body 71c of the support unit 22c and is provided for interacting with a coupling element 70c of the second plug-in unit 20c so as to enable coupling between the support unit 22c and the second plug-in unit 20c, and in the present case in particular a compensation element 36c of the second plug-in unit 20c.

A first fastening element 86c, assigned to the plug connector unit 18c, of the fastening unit 84a is moreover disposed on the further coupling element 74c. In the present case, the first fastening element 86c is configured so as to be in one piece with the further coupling element 74c. The first fastening element 86c herein is configured in an exemplary manner as a latching edge and is provided for interacting with a second fastening element 88c which is assigned to a steering gear housing 10c and is configured in an exemplary manner as a latching depression.

The invention claimed is:

1. A steering device comprising:
a steering gear housing defining a sensor receptacle region and a contacting clearance;
a steering sensor unit disposed, in an assembled state, in the sensor receptacle region;
a plug connector unit configured, in the assembled state, for electrically contacting the steering sensor unit in the contacting clearance of the steering gear housing, the plug connector unit comprising:
a plug-in unit configured for connecting to the steering sensor unit; and
a support unit which, at least in a preassembled state of the plug connector unit, is connected to the plug-in unit; and
an uncoupling unit configured to transmit force exerted in an assembly procedure of the plug connector unit to the plug-in unit and/or the support unit such that the connection between the plug-in unit and the support unit is released in the assembly procedure of the plug connector unit.

2. The steering device as claimed in claim 1, wherein the plug-in unit and the support unit are connected to one another in a force-fitting and/or form-fitting manner.

3. The steering device as claimed in claim 2, wherein the plug-in unit and the support unit are connected to one another by a latching connection and/or a plug-and-rotate connection.

4. The steering device as claimed in claim 1, wherein the plug connector unit is configured such that the force exerted in the assembly procedure of the plug connector unit includes at least one plug-in force component caused by a linear plug-in movement of the plug connector unit.

5. The steering device as claimed in claim 1, wherein the plug connector unit is configured such that the force exerted in the assembly procedure of the plug connector unit includes at least one rotary force component which is caused by a rotating movement of the plug connector unit.

6. The steering device as claimed in claim 1, wherein the uncoupling unit is at least partially configured in one piece with the steering sensor unit and/or the steering gear housing.

7. The steering device as claimed in claim 1, wherein the uncoupling unit comprises at least one uncoupling element disposed on the steering gear housing, the uncoupling unit configured as a ramp arranged in a region of the contacting clearance of the steering gear housing.

8. The steering device as claimed in claim 1, wherein the uncoupling unit comprises at least one further uncoupling element which is part of a further plug-in unit of the steering sensor unit that communicates with the plug-in unit.

9. The steering device as claimed in claim 1, wherein the plug-in unit comprises at least one plug-in element and at least one electrical line element configured to flexibly connect the plug-in element to the support unit.

10. The steering device as claimed in claim 1, wherein at least one of the plug-in unit and the support unit comprises at least one elastic compensation element which, at least during the assembly procedure of the plug connector unit, is configured to resiliently mount at least one plug-in element of the plug-in unit.

11. The steering device as claimed in claim 10, wherein the compensation element is configured as a rubber element, an elastomer element, a silicone element, a gel element, and/or a spring element.

12. The steering device as claimed in claim 10, wherein the compensation element is configured to support the plug-in unit so as to compensate for forces arising in the assembly procedure of the plug connector unit and/or to transmit said forces to the plug-in unit in such a manner that a coupling is established between the plug-in unit and the steering sensor unit resulting in direct and/or automatic electrical contacting of the steering sensor unit during the assembly procedure of the plug connector unit.

13. The steering device as claimed in claim 1, wherein the plug connector unit is configured to provide an electrical connection between the sensor receptacle region and an external side of the steering gear housing.

14. The steering device as claimed in claim 1, further comprising:
a guide unit configured to establish a defined orientation of the plug connector unit relative to the steering gear housing and to guide the plug connector unit relative to the steering gear housing in the assembly procedure.

15. A steering system comprising:
at least one steering device as claimed in claim 1.

16. The steering device as claimed in claim 1, wherein the at least one electrical line element includes a cable.

17. A plug connector arrangement of a steering device, the plug connector arrangement comprising:
a plug connector unit comprising:
a plug-in unit configured for connecting to a steering sensor unit of the steering device; and
a support unit which, at least in a preassembled state of the plug connector unit, is connected to the plug-in unit, the plug connector unit configured, in an assembled state, for contacting the steering sensor unit in a contacting clearance of a steering gear housing of the steering device; and
an uncoupling unit configured to transmit force exerted in an assembly procedure of the plug connector unit to the plug-in unit and/or the support unit such that the connection between the plug-in unit and the support unit is released in the assembly procedure of the plug connector unit.

18. A method for assembling a steering device that comprises a steering gear housing which defines a sensor receptacle region and a contacting clearance, a steering sensor unit disposed, in an assembled state, in the sensor receptacle region, and a plug connector unit configured, in the assembled state, for electrically contacting the steering sensor unit in the contacting clearance of the steering gear housing, wherein the plug connector unit comprises a plug-in unit configured for connecting to the steering sensor unit and a support unit which, at least in a preassembled state of the plug connector unit, is coupled to the plug-in unit, the method comprising:

transmitting a force which is exerted in an assembly procedure of the plug connector unit to the plug-in unit and/or the support unit in such a manner that the connection between the plug-in unit and the support unit is released in the assembly procedure of the plug connector unit.

\* \* \* \* \*